US012230959B2

(12) United States Patent
Amthor et al.

(10) Patent No.: US 12,230,959 B2
(45) Date of Patent: Feb. 18, 2025

(54) METHOD FOR OPERATING AN ENERGY MANAGEMENT SYSTEM, ELECTRONIC COMPUTING DEVICE FOR CARRYING OUT THE METHOD, COMPUTER PROGRAM, AND DATA CARRIER

(71) Applicant: Siemens Aktiengesellschaft, Munich (DE)

(72) Inventors: Arvid Amthor, Grabfeld OT Nordheim (DE); Thomas Baumgärtner, Erlangen (DE); Sebastian Thiem, Neustadt an der Aisch (DE); Lisa Wagner, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 770 days.

(21) Appl. No.: 17/415,593

(22) PCT Filed: Dec. 6, 2019

(86) PCT No.: PCT/EP2019/084030
§ 371 (c)(1),
(2) Date: Jun. 17, 2021

(87) PCT Pub. No.: WO2020/126559
PCT Pub. Date: Jun. 25, 2020

(65) Prior Publication Data
US 2022/0069617 A1   Mar. 3, 2022

(30) Foreign Application Priority Data

Dec. 21, 2018   (DE) ..................... 10 2018 222 753.5

(51) Int. Cl.
*H02J 13/00*   (2006.01)
*G05B 13/02*   (2006.01)
(Continued)

(52) U.S. Cl.
CPC ...... *H02J 13/00002* (2020.01); *G05B 13/024* (2013.01); *G06Q 50/06* (2013.01); *H02J 3/24* (2013.01)

(58) Field of Classification Search
CPC .... H02J 13/00002; H02J 3/24; G05B 13/024; G06Q 50/06
See application file for complete search history.

(56) References Cited

U.S. PATENT DOCUMENTS

2010/0274656 A1\*   10/2010   Genschel ................ B60L 53/80
                                                    705/14.27
2011/0184587 A1\*   7/2011   Vamos .................... G06Q 30/06
                                                    700/297
(Continued)

FOREIGN PATENT DOCUMENTS

DE   10 2014 217 930   3/2016   ................ H02J 3/00
EP   3 340 415          6/2018   ................ H02J 3/14

OTHER PUBLICATIONS

Search Report for International Application No. PCT/EP2019/084030, 13 pages, Feb. 5, 2020.
(Continued)

*Primary Examiner* — Zhipeng Wang
(74) *Attorney, Agent, or Firm* — Slayden Grubert Beard PLLC

(57) ABSTRACT

Various embodiments of the teachings herein include methods for operating an energy management system of a grid participant electrically connectable to an electrical grid at a grid connection point comprising: a) receiving data from an electricity exchange characterizing a remuneration for a first service provided to the electrical grid by the grid participant and/or a second service obtained by the grid participant from the electrical grid; b) determining a load profile for the grid participant as a function of the received data, wherein the energy management system at least temporarily operates the (Continued)

grid participant according to the determined load profile so the grid participant provides the power to the electrical grid and/or obtains the power from the electrical grid; and c) transmitting the load profile to the electricity exchange.

12 Claims, 1 Drawing Sheet

(51) Int. Cl.
 *G06Q 50/06* (2012.01)
 *H02J 3/24* (2006.01)

(56) References Cited

U.S. PATENT DOCUMENTS

| | | | |
|---|---|---|---|
| 2015/0088576 A1 | 3/2015 | Steven | G06Q 10/06 |
| 2017/0256908 A1 | 9/2017 | Lehmann | H01S 5/065 |
| 2018/0041157 A1* | 2/2018 | Son | G05B 15/02 |
| 2018/0268327 A1 | 9/2018 | Hooshmand et al. | |
| 2019/0058328 A1* | 2/2019 | Khan | H02J 3/008 |
| 2021/0224903 A1* | 7/2021 | Mathiesen-Ohman | H04L 9/50 |

OTHER PUBLICATIONS

Bitsch, Rainer et al., "Technische Anforderungen an dezentrale Versorgungsstrukturen in Europa," In: FVEE Themen 2001: Integration erneuerbarer Energien, URL: https:llwww.fvee.de/index.php?id=195&sb_damorder%5Buid%5D=1578&cHash=544e2c3e4198af8624f58d6f228b0f86, pp. 14-21 (German langage w/ English translation), 2001.

Schmid, Jürgen et al., "Energie und Kommunikation," In: FVEE Themen 2001: Integration erneuerbarer Energien, URL: https://www.fvee.de/index.php?id=195&sb_damorder%5Buid%5D=1578&cHash=544e2c3e4198af8624f58 d6f228b0f86, pp. 43-50 (German language w/ English translation), 2001.

Horenkamp, Willi et al., "VDE-Studie Dezentrale Energieversorgung 2020," In: Energietechnische Gesellschaft im VDE (ETG), URL: https://www.vde.com/resource/blob/792808/db366b86af491989fcd2c6ba6c6f21ad/etgstudie-dezentrale-energieversorgung2020komplette-studie-data.pdf, pp. 1-2, 5-7, 17-18, 43-45, 47-50, 58-60, 115-117, 144-149 (German language w/ English translation), 2007.

Strauss, Philipp et al., "Modellregionen für intelligent vernetzte Energiesysteme," Transformationsforschung für ein nachhaltiges Energiesystem; Beiträge zur FVEE Jahrestagung, URL: https://www.fvee.de/index.php?id=195&sb_damorder%5Buid%50=4637&cHash=fd35ae1b823a109116f098f85ea560f0, pp. 112-118 (German language w/ English translation), 2011.

Wikipedia, "Smart Market," URL: https://de.wikipedia.org/w/index.php?title=Smart_Market&oldid=164168317, 4 pages (German language w/ English translation), Apr. 2, 2017.

Wikipedia, "Intelligentes Stromnetz," Die freie Enzyklopädie; Internetauszug, URL: https://de.wikipedia.org/w/index.php?title=Intelligentes_Stromnetz&oldid=183017345, 39 pages (German language w/ English translation), Nov. 23, 2018.

Wikipedia, "Demand Response," URL: https://en.wikipedia.org/w/index.php?title=Demand_response&oldid=873174079, 13 pages, Dec. 11, 2018.

German Office Action, Application No. 102018222753.5, 15 pages, Dec. 6, 2019.

Korean Notice of Allowance, Application No. 2021-7019517, 3 pages, Dec. 1, 2023.

* cited by examiner

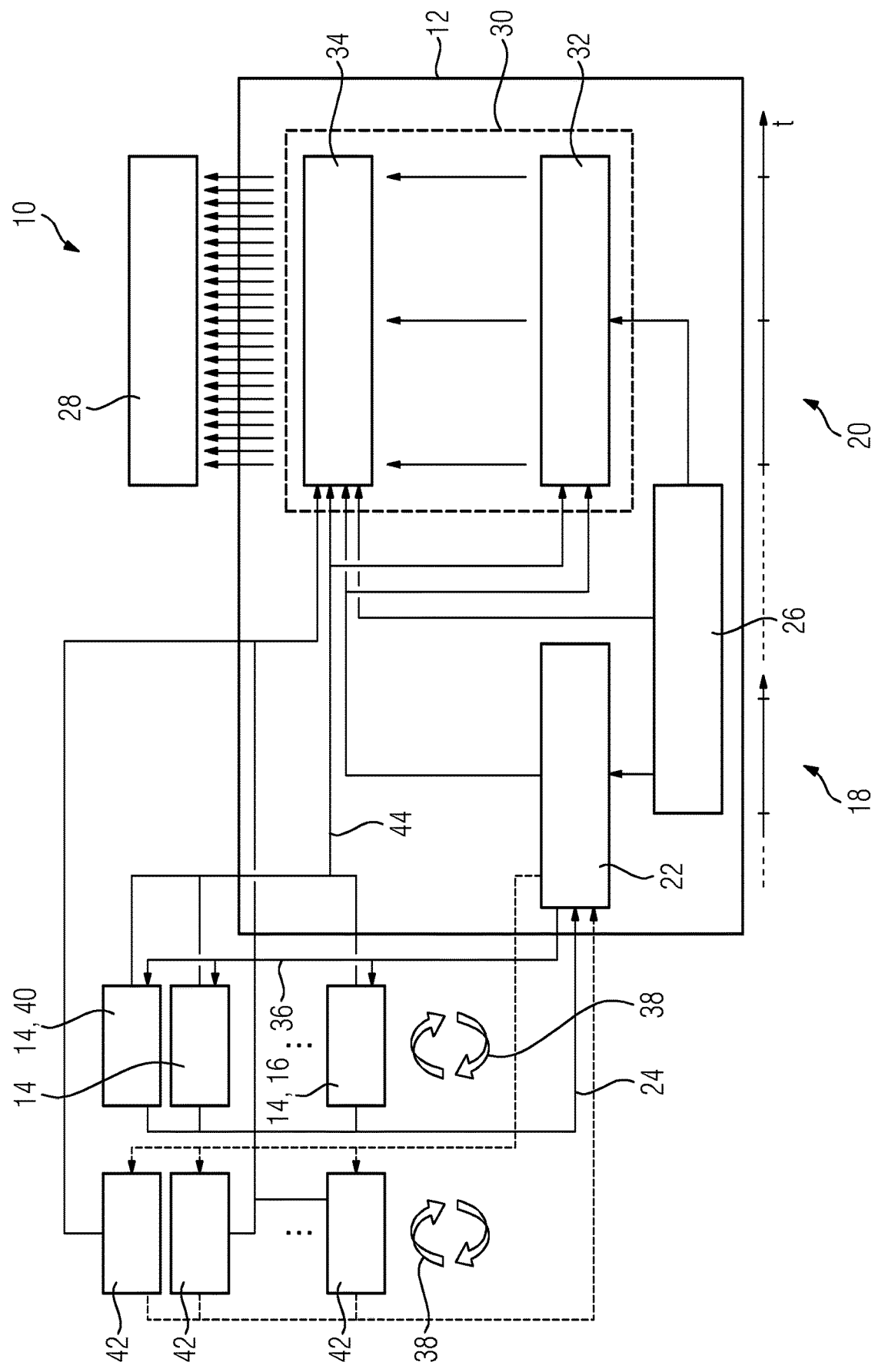

METHOD FOR OPERATING AN ENERGY MANAGEMENT SYSTEM, ELECTRONIC COMPUTING DEVICE FOR CARRYING OUT THE METHOD, COMPUTER PROGRAM, AND DATA CARRIER

CROSS-REFERENCE TO RELATED APPLICATIONS

This application is a U.S. National Stage Application of International Application No. PCT/EP2019/084030 filed Dec. 6, 2019, which designates the United States of America, and claims priority to DE Application No. 10 2018 222 753.5 filed Dec. 21, 2018, the contents of which are hereby incorporated by reference in their entirety.

TECHNICAL FIELD

The present disclosure relates to energy management systems. Various embodiments of the teachings herein may include electronic computing devices configured for carrying out a method for operating an energy management system, computer programs, and/or electronically readable data storage media, which are respectively suitable for reproducing the steps of methods for operating an energy management system.

BACKGROUND

Compliance with the Paris Climate Agreement, the increasing competitiveness of renewable energy sources, and new business models will result in a significant increase in the use of renewable energy sources in the future, both in Germany and in the other member states of the Climate Agreement. In this regard, assuming that the current level of subsidies is maintained, Germany, for example, will be able to, or will have to, increase the share of renewable energies in gross final energy consumption from around 13% currently to approximately 60% by 2050. In purely mathematical terms, this means an installed capacity of renewable energy which is 4.5 times higher compared to today, without taking into account losses through curtailment and/or postponement due to storage. A large portion of this expansion will presumably take place mainly in the distribution grids. In addition, an ever-increasing number of energy generation facilities are being installed on the end-user side. In addition, heat and cooling supply processes are increasingly being electrified, in particular by means, for example, of multimodal systems and sector coupling. Furthermore, an increase in electromobility and the expansion thereof will change the energy system over the long term.

SUMMARY

The teachings of the present disclosure describe methods for operating an energy management system of at least one grid participant which is connected to a grid connection point on an electrical grid, so that said grid participant can participate in a dynamic market for electrical energy in a particularly advantageous manner. For example, some embodiments include a method for operating an energy management system (12) of at least one grid participant which is electrically connected or connectable to at least one electrical grid at a grid connection point, comprising the steps of:
a) by means of the energy management system (12): receiving data (24) provided by least one electricity exchange (16), which characterize at least one remuneration for at least one service provided to the electrical grid by the grid participant, and/or at least one remuneration for at least one service obtained by the grid participant from the electrical grid;
b) by means of the energy management system (12): determining at least one load profile (36) for the grid participant as a function of the received data (24), wherein the grid participant may be, or is, operated by means of the energy management system (12) at least temporarily according to the determined load profile (36), in such a way that the grid participant provides the power to the electrical grid and/or obtains the power from the electrical grid; and
c) transmitting the load profile (36) to the electricity exchange.

In some embodiments, steps a) to c) are repeated until at least one termination condition has been met.

In some embodiments, the termination condition comprises a time of day at which a provision of the data (24) effectuated by the electricity exchange (16) does not occur.

In some embodiments, the termination condition is satisfied if the remuneration reaches or exceeds a threshold value.

In some embodiments, the service which is provided to the power grid by the grid participant comprises that the grid participant feeds electrical energy into the electrical grid and/or provides a system service, in particular a stabilization of the electrical grid.

In some embodiments, the service which is obtained by the grid participant from the electrical grid comprises that the grid participant receives electrical energy from the electrical grid.

In some embodiments, the load profile (36) is calculated as an optimization problem which, in particular, is discrete and linear.

In some embodiments, the energy management system (12) compares the power characterized by the load profile (36) as a setpoint power with an actual power output of the grid participant, and calculates a compensation which is to be provided for a difference between the setpoint power and the actual power output determined by the comparison.

In some embodiments, the power is limited to a maximum value and/or or to a minimum value.

In some embodiments, the energy management system (12) forms a virtual power plant (42) with at least one further associated energy management system (12) which is connected or is connectable to the electrical grid.

In some embodiments, the energy management system determines the load profile (36) as a function of the formation of the virtual power plant (42).

As another example, some embodiments include an electronic computing device which is configured for carrying out a method as described herein.

As another example, some embodiments include a computer program which can be loaded directly into a memory of an electronic computing device, comprising program means in order to carry out the steps of the methods as described herein, if the program is executed in a computing device.

As another example, some embodiments include an electronically readable data storage medium having electronically readable control information stored thereon which comprises at least one computer program as described herein and which is designed in such a way that it carries out a method as described herein when the data storage device is used in an electronic computing device.

BRIEF DESCRIPTION OF THE DRAWINGS

Additional features, details, and advantages of the teachings of the present disclosure will become apparent from the following description of an exemplary embodiment, and with reference to the drawing.

The single FIGURE depicts a schematic interaction diagram for illustrating functionalities of an energy management system incorporating teachings of the present disclosure.

DETAILED DESCRIPTION

As described herein, some embodiments of the teachings of the present disclosure include methods for operating an energy management system, which may be designed as an energy subsystem, of at least one grid participant which is electrically connected or connectable to at least one electrical grid at a grid connection point. A grid participant may, for example, be a building and/or an industrial participant which, in particular, comprises at least one energy load, for example, in the form of at least one controllable consumer, in particular an electricity consumer, for example, for supplying heating or cooling. Furthermore, the grid participant comprises at least one energy generator, for example, a photovoltaic system and/or a wind-driven generator, and at least one energy storage device, in particular in the form of a battery, for example.

In the instant disclosure, an energy generator is a device which converts energy from one form of energy, for example, wind energy, into electrical energy. Thus, the energy generator provides electrical energy which has been converted from another form of energy by the energy generator. Thus, the energy generator is merely a producer of electrical energy via the conversion of energy, or rather, an energy converter, and can serve as a source of electrical energy. Thus, the energy management system is capable of providing power to, or withdrawing power from, the electrical grid, in particular in the form of electrical energy. The at least one energy storage device, the at least one energy generator, and the at least one consumer are respectively referred to as, in particular, an aggregate or an asset, or are combined under one of the two terms.

In other words, the method taught herein may be used for operating the energy management system of a grid participant which is connected to an energy grid or electrical grid at the grid connection point and which comprises an energy load, a generator of electrical energy or an energy source, and an energy storage device. In this case, the energy load, the energy source, and/or the energy storage device together form service flexibility or a flexibility option, wherein at least a portion of this service flexibility can be provided to the electrical grid via the grid connection point, in particular by means of a corresponding controller, for example, by means of an electronic computing device of the energy management system.

In some embodiments, other entities are connected to, or integrated into, the electrical grid, which, for example, comprise analogous energy management systems, so that the service or service flexibility can be provided in particular to the entities connected to the energy grid. The respective entity is a respective grid participant.

In order to be able to participate particularly well in the electrical grid, an example method comprises several steps. In a first step a), data provided by at least one electricity exchange are received by means of the energy management system, which, in particular, includes or features an electronic computing device.

The data characterize at least one remuneration for at least one service provided to the electrical grid by the grid participant, and/or at least one remuneration for at least one service obtained by the grid participant from the electrical grid. In a further step b), at least one load profile for the grid participant is determined by means of the energy management system or by the energy management system, as a function of the received data, wherein the grid participant may be, or is, operated by means of the energy management system at least temporarily according to the determined load profile, in such a way that the grid participant provides the power to the electrical grid and/or obtains the power from the electrical grid. Furthermore, in a further step c), the load profile determined in step b) is transmitted to the electricity exchange.

In other words, in step a), data, the content of which may represent at least one kind of consumption cost curve, is retrieved or received in particular via an interface of the energy management system. In step b) of the method, the load profile is determined, which corresponds to forecast scheduling, in particular day-ahead scheduling, in which the load profile is calculated as a function of the consumption cost curve for the at least one energy source, the at least one consumer, and/or the at least one energy storage device of the grid participant.

In some embodiments, the electricity exchange is a market participant or a market for energy or electricity. In some embodiments, an electricity exchange of the aforementioned kind is a market, in particular an organized market, for at least one service, said market being able to function in a manner similar to that of a securities exchange, wherein, in particular, time-limited or delimited quantities of electricity or energy can be traded as a service on an electricity exchange. One advantage of electricity trading via the electricity exchange, for example, the EEX (European Energy Exchange) or the EPEX (EPEX Spot SE, European Power Exchange), wherein trading on the EPEX, for example, takes place at least in part in Leipzig, is a bundling of an existing or demanded quantity of energy, whereby a high level of liquidity can be achieved, and energies can thereby be exchanged in a particularly efficient manner.

In some embodiments, on an electricity market, for example, quantities of energy which, for example, can be generated in power plants, can be sold, in particular in advance, to market participants, for example, entrepreneurs. In principle, electricity trading results in supply contracts which obligate a supplier to feed certain quantities of energy into the electrical grid, or to draw certain quantities from the electrical grid. Up to now, electricity trading on an electricity exchange has not been possible for small consumers such as grid participants. The method according to the present invention allows virtually any grid participants to participate in the electricity market or the electricity exchange.

With, or by means of, the energy management systems described herein, the load profile can be calculated in such a way that it is so-called day-ahead scheduling, wherein by means of the energy management system, a schedule for the next day or the next 24 hours can be calculated or specified, in particular for the at least one energy generator, but also for the at least one consumer.

In some embodiments, a functionality of the energy management system is expanded in such a way the energy management system can participate in the, in particular local, energy trading and/or electricity trading, so that, by means of the methods, particularly advantageous and, in particular energy-efficient, operation of the energy management system is possible. For this purpose, the energy management system may submit a bid for a quantity of energy or service, in particular in step c), by transmitting the calculated load profile, wherein said energy management system thereby participates in a market, the electricity exchange, which is in particular trimmed for economic efficiency. The electricity exchange may also be referred to as a so-called price-based black-box market. By means of the load profile, particularly advantageous options for power provision or power consumption by the individual aggregates, in particular by the at least one energy generator or the at least one energy source, for example, a wind turbine and/or a photovoltaic system of the grid participant on the grid connection point, are calculated within the 24-hour forecast scheduling, i.e., the day-ahead scheduling.

In some embodiments, steps a) to c) of the method are repeated, so that by means of the energy management system or EMS for short, the load profile may be updated iteratively, or in other words, an iterative scheduling calculation may be carried out. For this purpose, in particular a price curve which takes into consideration at least the remuneration for at least the power provided by the grid participant to the electrical grid, and/or at least the remuneration for at least the power obtained by the grid participant from the electrical grid, in particular over a period of time, is obtained or retrieved by the energy management system from the market under consideration, the at least one electricity exchange, wherein an electricity exchange corresponds to one respective market.

On the basis of this price curve, the load profile is calculated, in particular by means of optimization calculations, and subsequently transmitted to the market. This price change is then retrieved by the energy management system in particular through iterative repetition, at least once, in particular when a price change on the electricity exchange occurs as an event trigger, through the repetition of step a) by the data. In some embodiments, on the basis thereof, new day-ahead scheduling or a new load profile is adjusted, having updated specifications for at least temporarily providing or obtaining the power of the grid participant.

In some embodiments, in which a price change of the market or the electricity exchange is respectively retrieved, the iteration or the renewed execution of steps a) to c) may also be carried out in cyclical steps, whereby quasi-active participation of the energy management system in the electricity exchange may result.

In some embodiments, decentralized facilities such as the grid participant, which is in particular, for example, a building comprising, for example, photovoltaic systems, and/or an industrial participant, and which can thus be operated privately and/or commercially, are increasingly characterized by the fact that, in addition to the pure generation systems or energy sources such as photovoltaics, they also have their own energy storage systems such as batteries, and also have, in particular controllable, consumers. The generation facilities, the storage systems, and the consumers are grouped together as so-called assets or aggregates. From the point of view of electrical energy or from the point of view of the electrical grid, these assets of the grid participant may constitute an interconnection with positive and negative operating reserves. The operating reserve or control reserve makes it possible to provide the grid participants with the electrical power needed by the respective grid participant in the event of unforeseen events. For this purpose, for example, short-term power adjustments may be made in the, in particular smart, electrical grid, for example, by the respective grid subscriber and/or, for example, by controllable power plants. In some embodiments, the interconnection of the assets of the grid participant may also, for example, provide a system service which is required for distribution of the electrical energy in the electrical grid, as an alternative service or a service in addition to electrical power; the system service may be, for example, voltage stability.

By means of a cellular approach, a largest possible number of grid participants which are respectively equipped with energy management systems, an option could be provided to integrate these, in particular decentralized, facilities or grid participants into the electrical grid in a manner which may be advantageous and, in particular, useful for the grid, i.e., having a positive grid influence on the electrical grid. In some embodiments, in particular the energy generation and consumption are first matched at the regional level, in particular in a low-voltage electrical grid and/or in a medium-voltage electrical grid, using the locally available service or service options or flexibility options provided in particular to the respective grid participant.

Thus, the services which are available for bid by the respective grid participant may be available or provided within the respective electrical grid, i.e., for example, the low-voltage electrical grid or the medium-voltage electrical grid, by means of the methods described herein. This may be done through the restriction to the respective electrical grid in such a way that the energy or service, in particular the electrical energy or service, and thus the respective service flexibility, of the respective grid participant having the assets, is first provided locally in its own electrical grid, instead of having to be provided to remote facilities via transport grids or transport contactors. The same applies to corresponding service options of remote facilities or grid participants, which must be retrieved via transport grids into the respective electrical grid of the respective energy management system or the grid participant thereof.

In order to satisfy this approach, respective energy management systems may be operated via the methods described herein, so that, for an infrastructure which comprises the electrical grid and the grid participants connected to it, the electricity exchange mapping the infrastructure, i.e., the service via the distribution of the power in the electrical grid, can be operated. It is thus possible to achieve, in particular regional, trading of a wide variety of energy services or control reserves and/or system services, in particular taking into consideration an expected grid restriction of the electrical grid.

In some embodiments, a decisive criterion for effective and, in particular cost-optimized, trading, is sufficient liquidity in each case. This may be achieved through the design of the marketplace or the electricity exchange, which enables the simultaneous trading of a wide variety of energy products, for example, the energy output or reserve power and/or at least one of the system services by participants in the corresponding local energy market, for different time units and delivery times. In some embodiments, all grid participants are to be included in order to have a particularly high level of liquidity. Thus, the grid participants configured, for example, as industrial end customers on the electrical grid, or the grid participants configured as a building or private household, with their assets, i.e., their mix of generator facilities or energy sources, for example, the aforementioned photovoltaic systems, energy storage devices, i.e., in particular batteries and electrical consumers, which are in particular controllable, for example, heat pumps, may participate, in particular directly, in this trading of services in a particularly advantageous manner.

The energy management system of the grid participant, in particular acting as the end user, may actuate the, in particular smart or intelligent, assets, i.e., the at least one generation facility, the at least one storage system or the energy storage device, and the at least one load or the at least one consumer, within, for example, a building and/or an industrial operation, in such a manner that the operation of the overall system, i.e., the combination of all assets of the grid participant, may be carried out in a particularly efficient and/or particularly economical manner. The methods described herein make it possible to interact with a respective energy trading platform, i.e., the respective at least one electricity exchange, in particular in an automated manner, and how this interaction is technically feasible.

Since, for example, in 2018, energy trading on a national, German level, as well as across national boundaries, for example, between Germany, Austria, and Switzerland, takes place on the EPEX exchange in Leipzig, on which only a particularly few actors or traders participate is this trading, the methods described herein include an increasing number of participants or traders. For example, the number of participants in EPEX in Western Europe is below 1000, at least for the time being. Furthermore, in particular in the case of the trading platform or electricity exchange EPEX, the assumption is made that the electrical grid, i.e., the underlying physical component, is a copper plate, i.e., the demanded power behaves physically like a copper plate. This behavior is used as a basis for achieving the highest possible efficiency or liquidity, and above all, particularly high economic efficiency, when combining energy generation and energy consumption.

In reality, it is particularly clear that the electrical grid cannot be regarded as a copper plate, which means that combined bids on the trading platform are not feasible. This may, in particular, be assessed as an indication that the trading of energy or service, as is possible by means of the methods described herein, is to be carried out in the, in particular local, electricity grids, for example, the aforementioned lower-voltage or medium-voltage grids. Thus, for example, in countries outside Europe or the European Union, for example, the United States of America, nodal pricing of the market is used, wherein grid constraints may also be taken into consideration in the nodal pricing. Thus, up to now, regionalization of the electricity market may result in less competition, since, depending on the size of the defined market area, a concentration of large electricity producers or electricity consumers is possible; however, this concentration is not unproblematic, as it encourages collusive behavior by the market participants. This is based on the fact that the electricity prices in the individual market areas are dependent on grid node points, the so-called nodes. Thus, a large market participant may attempt to determine the price through nodal pricing.

Generally, trading on the electricity exchange takes place by means of blocks which define power in terms of time and/or quantity. There are often standardized products on the respective electricity exchange, for example, a so-called base load block, which covers the base load of an entire day for the corresponding electrical grid. The base load is the amount of electricity that must always be available, regardless of peak times having particularly high electricity consumption. The base load may, for example, be determined as being a constant power output of one megawatt over a period of 24 hours. For periods having particularly high electricity consumption, for example, in particular during the day, in particular in an interval between 8 a.m. and 8 p.m., during which, for example, some industrial plants and businesses are in operation, and the power consumption is thus greater than outside business hours, so-called peak load blocks may be offered. Accordingly, this offer may be included in the tariffs retrieved by the electricity exchange, whereby said offer will be taken into consideration accordingly when forming or calculating the load profile.

In some embodiments, a further advantage results, since the grid participant, in particular at least the small, decentralized, distributed energy subsystem or the energy management system, for example, of the building or a multi-modal microgrid which is also equipped with an energy management system, can actively offer its power output to an electricity exchange via a load profile, by transmitting the load profile in step c). Thus, without the methods described herein, at most, a combination of several grid participants into a virtual power plant was previously possible, wherein the respective virtual power plant was often combined from entities or respective grid participants distributed across the entire country, and also did not actively participate in an electricity exchange. Thus, a further advantage may be that energy may be consumed in a particularly economical manner, on the basis of the data which are received from the electricity exchange, and which characterize the remunerations, and thus, for example, may include dynamic price information, wherein these data may be received at least from one energy supplier which trades on the electricity exchange, and may also characterize an index of the electricity exchange. It is then also possible to react dynamically and actively to these data by means of the load profile, by providing power to the electrical grid.

In some embodiments, an interface is provided on the energy management system for participating in an electricity market, wherein scheduling, in particular day-ahead scheduling, may be carried out by means of the energy management, in particular iteratively, by calculating the load profile, and corresponding power may be offered.

In some embodiments, the energy management system may receive data from more than one electricity exchange, and transmit the load profile accordingly to more than one electricity exchange, so that power may be offered by the energy management system simultaneously on several markets, and in particular by the assets which are associated with it. The several energy exchanges may, for example, be several energy markets which are independent of one another and which may thus provide different data to the energy management system. The data may contain different values for at least one remuneration of the power provided by the grid participant, as well as different values for a remuneration for at least the power obtained by the grid participant. In the case of several market participants or energy exchanges, steps a) to c) of the method may also be iteratively repeated until the energy management system has provided corresponding load profiles, in particular, after a final iteration in each case, whereby, in particular, a price on the respective market or on the respective electricity exchange may be fixed.

In some embodiments, in the event that the data for the remunerations have not changed between a first and a second reception, i.e., a repetition of step a), updated load profiles may still result by repeating steps b) and c). These load profiles may be taken into consideration by the method, so that the load profiles are always updated and retransmitted accordingly.

In some embodiments, as one of the electrical energy exchanges or as one of the energy markets, the respective energy supplier of the grid participant, which is already generally connected to the energy management system in any case, by means of an existing energy contract with the grid participant, may be viewed as a respective individual energy market or an individual electricity exchange by the method.

Thus, for example, a further advantage thus results for the methods described herein, since said method may, for example, continue to be operated as a conventional energy management system in a usual manner when trading closes on an electricity exchange.

In some embodiments, steps a) to c) are repeated until at least one termination condition has been satisfied, whereby the repetition of the steps stops or may be stopped. In other words, a repetition of the method steps or an iteration of the method is stopped when a certain framework condition, which in particular relates to the grid participant, occurs. Such a framework condition or the termination condition may, for example, be a time window without trading on the electricity exchange. As a result, it is possible to carry out the method in a particularly efficient manner, since, for example, superfluous calculations of the load profile do not have to be performed, which, for example, may save electrical energy in a particularly advantageous manner.

In some embodiments, the termination condition comprises a time of day at which the data is not provided by the electricity exchange. In other words, repetition of the method stops as of a point in time after which no new data, in particular in the form of price curves or remunerations, can be retrieved from the at least one electricity exchange. As a result, the power which is promised to the electrical grid by the load profile can be provided simultaneously over a period of time, i.e., a time interval during which the data is not provided.

In some embodiments, the termination condition is satisfied if the remuneration reaches or exceeds a threshold value. In other words, in the method, it may be specified that the power to be provided to the electrical grid, or the power to be obtained from the electrical grid, i.e., positive or negative power of the grid participant with respect to the electrical grid, is carried out or provided for a certain determinable remuneration. This may provide the advantage that, for example, iteration of the method may be stopped, whereby particularly efficient operation of the energy management system may be achieved. In some embodiments, the assets or aggregates which are controlled by the energy management system of the grid participant may be operated in a corresponding manner.

In some embodiments, the service provided, or to be provided, to the electrical grid by the grid participant, comprises that the grid participant feeds electrical energy into the electrical grid, and/or the service comprises a system service, for example, in particular stabilization of the electrical grid.

In some embodiments, the service which is obtained by the grid participant from the electrical grid comprises that the grid participant receives electrical energy from the electrical grid. In other words, the service or service flexibility is provided as an energy service, for example, in the form of different energy products, such as photovoltaic and/or wind power, or as a control reserve or as a system service, or is consumed by a consumer, for example, a heat pump. As a result, via the method, it is possible to provide different services to the electrical grid or to obtain different services from the electrical grid in an advantageous manner.

This provides the advantage that the method can be adapted in a particularly flexible manner to the characteristics of a respective electrical grid.

In some embodiments, the load profile is calculated as an optimization problem which is, in particular, discrete and linear. For this purpose, the optimization problem is solved using an optimization algorithm executed on the electronic computing device of the energy management system, which, for example, may be in particular a minimization algorithm or a maximization algorithm, thus solving the load profile in a particularly advantageous manner.

In some embodiments, the energy management system compares the power characterized by the load profile as a setpoint power with an actual power output of the grid participant. Furthermore, a compensation to be provided is calculated for a difference between the setpoint power and the actual power output which is determined by the comparison. In other words, the assets of the energy management system are controllable by the same, so that positive or negative power can be provided to the electrical grid, wherein the electrical grid or the electricity exchange can expect the power ensured by means of the energy management system in the load profile, in particular in terms of quantity and/or in terms of time. If this expectation cannot be met, for example, due to a lack of wind for a wind turbine which may be an asset of the energy management system or the grid participant, this may, for example, have effects on the electricity exchange.

In order to be able to compensate for the effects, for example, a weighting factor which, for example, includes compensation in particular for the electricity exchange, may be included in the calculation of a load profile to be calculated, subsequent to the power not having been provided. The compensation or weighting factor may, for example, be understood to be penalty costs associated with the energy management system, which come into effect if the energy management system is unable to meet, in particular, the minimum and/or the maximum quantity requirement of the respective energy market or the respective electricity exchange for power which the energy management system is to obtain and/or feed in. The energy management system features, for example, load management, which may be responsible for balancing the electricity supply in the electrical grid with the electrical load or power output of the grid participant. The load management may attempt, in particular after transmitting the final load profile or after completing the day-ahead scheduling, to make this compensation, or the penalty terms determined by the market or the electricity exchange, particularly low.

In some embodiments, the power is limited to a maximum value and/or to a minimum value. In other words, it is determined, for example, at the request of an operator, whether the power which is delivered to each market or to the respective electricity exchange, or which is drawn therefrom or from the electrical grid, is to be limited upwards and/or downwards. This enables particularly good utilization of the grid participant and thus particularly efficient operation of its assets, which are controllable by the energy management system.

In some embodiments, the energy management system forms a virtual power plant with at least one other associated energy management system which is connected, or connectable, to the electrical grid. A virtual power plant refers to an aggregation of several entities of the grid participants, i.e., an interconnection of decentralized, distributed electricity generation units or electricity sources, for example, respective photovoltaic facilities of the respective grid participant or hydroelectric power plants, biogas, or wind power, as well as micro-CHP plants, to form a pool which can reliably provide electrical power and may thus at least partially replace power output from large power plants.

In some embodiments, the energy management system determines the load profile as a function of the formation of the virtual power plant. In other words, the energy management system may receive incentives in the form, for example, of price tariffs or particularly favorable remunerations, for reserving capacity in the form of its power output for a virtual power plant, for example, in the form of minute reserves, or these may be taken into consideration in other load profiles or in future day-ahead scheduling. As a function of these price tariffs or incentives which are taken into consideration in the day-ahead scheduling, the energy management system may now decide whether or not capacity or power output is to be provided.

Furthermore, in addition to the virtual power plant acting as, for example, a flexibility market, similarly to an electricity exchange, there may be other, additional markets or electrical energy exchanges, which, for example, respectively provide flexibility prices which can be retrieved by the energy management system. After each update of such a flexibility price of the respective market, or after cyclical processes such as the aforementioned iteration, a new day-ahead schedule, i.e., a new load profile, is calculated by the, in particular electronic, computing device of the energy management system. The resulting flexibilities or service flexibilities are then communicated to the respective market or the respective electricity exchange in the form of the calculated load profiles. In turn, each market can then announce its final flexibility prices, whereupon the energy management system receives said prices and, as a function of said prices, fixes the associated flexibilities in the form of the power to be delivered or received, thus constituting a final iteration of the method with the respective market. Furthermore, the overall advantage may result for the electrical grid that, for example, a control reserve or an operating reserve can be granted by combining several energy management systems to form the virtual power plant.

In some embodiments, an electronic computing device of a management system is configured for carrying out a method as described above.

In some embodiments, a computer program implements a method as described herein on an electronic computing device. Here, the computer program may also exist in the form of a computer program product which can be loaded directly into a memory of a computing device, comprising program code means in order to carry out a method according to the present invention if the computer program product is executed, in particular, on a computing device of the computing device.

In some embodiments, an electronically readable data storage medium comprises electronically readable control information which is stored thereon and which comprises at least one computer program that carries out a method as described herein when the data storage medium is used in a control device or in an electronic computing device of an energy management system.

The characteristics and refinements of the methods incorporating teachings of the present disclosure, as well as the corresponding advantages, are respectively transferrable in a corresponding manner to the electronic computing device and/or to components which are used, or are usable, for carrying out the methods, and vice-versa. For this reason, a respective explicit formulation of each aspect will be omitted herein, both for the method and for the electronic computing device.

The single FIGURE shows a schematic interaction diagram 10, which depicts processes and functional relationships between an energy management system 12 of a grid participant which is electrically connected or connectable to at least one electrical grid, and at least one energy market 14, which may, in particular, be an electricity exchange 16. In addition to the functional relationships, a time structure of the processes is indicated by a corresponding schematically indicated time axis t. The time axis is depicted only schematically and in sections, and not necessarily to scale with respect to the functional relationships. Essentially, the time axis has two areas or portions, one of which is associated with a previous day 18, and the other with a current day 20.

With reference to the interaction diagram 10, a method is to be presented, by means of which the energy management system 12 can be operated in a particularly advantageous manner. For this purpose, the energy management system 12 presently comprises a module for day-ahead scheduling 22, by means of which scheduling for the current day 20 may be carried out on the previous day 18. When performing day-ahead scheduling 22, a load profile 36 is created which, in particular, reflects a load profile of the grid participant at a grid connection point over the current day 20. The day-ahead scheduling 22 relates to a time horizon of 24 hours starting at the beginning of the current day 20. Data 24 available at the time of scheduling may be taken into consideration.

These data 24 are provided in a step a) by the at least one electricity exchange 16 or a market participant, and are received by the energy management system 12, in particular via a suitable interface. The data 24 which are provided by the at least one electricity exchange 16 characterize at least one remuneration for at least one service provided to the electrical grid by the grid participant, and/or the data 24 characterize at least one remuneration for at least one service obtained by the grid participant from the electrical grid. In other words, the data 24 of the respective energy market 14 or electricity exchange 16 may provide prices for feeding in power or for meeting demand for power. In some embodiments, the the data 24 may also include a price curve of the energy market 14 or the electricity exchange 16, one, for example, being EPEX.

Thus, when the data is received in method step a), in particular by the day-ahead-scheduling module 22, in a calculation method which is carried out in the following method step b), and which may be an optimization method which, in particular, is discrete and linear, the load profile 36 is calculated, as already mentioned. Then, in a step c), the load profile 36 determined in step b) on the basis of the received data of step a), in particular by means of the day-ahead scheduling 22, is transmitted back to the electricity exchange 16 or the energy markets 14. Thus, the steps of the method have each been carried out once.

In some embodiments, the energy management system 12 comprises a computing device and at least one interface, wherein the methods described herein are carried out on a computing device of the energy management system 12, wherein communication, i.e., in particular, the transmission or reception of the data 24 or of the load profile 36, takes place via at least one interface. The modules 30, the day-ahead scheduling 22, and other modules, are to be understood, in particular, to be modules which are executable or controllable by the electronic computing device.

Scheduling parameters 26 may be taken into consideration for determining or calculating the load profile 36, in particular by means of optimization problems. These scheduling parameters 26 may include, for example, certain forecasting models, for example, for operating states of facilities and/or components of the grid participant, referred to below as assets 28. The assets 28 of the grid participant may in particular be at least one facility for electricity generation, or an electricity source, for example, a photovoltaic facility and/or a wind turbine. In addition, another part of the assets 28 is, in particular, an energy storage device, for example, a battery; and finally, another asset 28 of the grid participant is an energy consumer, for example, a heat pump or another heating and/or cooling device. Furthermore, the scheduling parameters 26 may also include, for example, weather data, which, for example, evaluate an asset 28 of the grid participant configured as a photovoltaic system differently when calculating the power output, for example, due to cloud formation.

In some embodiments, a wind strength for an asset configured as a wind turbine, may be stored in the scheduling parameters 26 as a weather event. The scheduling parameters 26 may be dynamically updated, or be available, on a regular and/or continuous basis, and may be provided in a respective current form to a module provided as part of the energy management system 12 for providing power during the current day 20. This is schematically indicated by corresponding arrows. The module 30 presently comprises intraday rescheduling 32 and load management 34, to which respective results of the intraday rescheduling 32 are provided. By means of the intraday rescheduling 32, a re-evaluation and rescheduling of resources available during the current day 20 (power from step b)) in the form of the assets 28 may be carried out, on the basis of the day-ahead scheduling 22, taking into consideration current or updated information available then, for example, respectively updated data 24 and, in addition, possibly on the basis of the scheduling parameters 26, and/or on the basis of detected deviations between the day-ahead scheduling 22, i.e., in particular, the load profile 36 transmitted in step c), and an actual operation during the current day 20.

In some embodiments, the steps a, b, and c are repeated, so that a load profile 36 may be calculated in each case, on the basis of the most recent data 24 possible. The repetition of the steps is indicated by the iteration loop 38. In some embodiments, the repetition of steps a) to c) may take place until at least one termination condition has been reached, whereby a repetition of steps a) to c) is stopped. Such a termination condition may be a time of day at which a provision of the data 24 effectuated by the electricity exchange 16 does not occur. In other words, on the energy market 14 or on the electricity exchange 16, the power to be delivered or provided, i.e., a positive or negative power, of the grid participant, is traded only, in particular, during certain times of day. Outside these trading hours, no updated data 24 can be retrieved, with the result that a re-execution of steps b) and c) shows no change in comparison to a load profile 36 calculated in the iteration immediately prior thereto.

In some embodiments, the termination condition or an additional termination condition may comprise the remuneration exceeding or reaching a particular threshold value. In other words, the load profile 36, and thus the power to be provided or to be drawn by the grid participant by means of the energy management system 12, in particular, the quantity thereof, is no longer varied, in particular for the next 24 hours.

Examples of an energy market 14 or an electricity exchange 16 and types of trade practiced there may, for example, include futures trading on the EESX (European Energy Exchange), trading in system services, short-term trading, for example, via day-ahead actions, for example on the EPEX (European Power Exchange), or day-ahead trading, for example, on the EPEX Spot.

The energy management system 12, or EMS for short, may be viewed as an energy subsystem, wherein many of these energy subsystems or energy management systems 12 are distributed in a decentralized manner, and are thus to be understood as being decentralized components of the electrical grid, or as being decentralized, distributed grid connection points of the electrical grid, at each of which electrical energy may be fed into or drawn out of the electrical grid. The method then provides the advantage that at least one of these energy management systems 12 or energy subsystems may actively participate in electricity trading with an, in particular, local, energy market 14 or electricity exchange 16, in particular by means of quantity-based service. The advantage of active participation in trading by the energy management system is that an entire energy system can be operated more economically or particularly economically, and/or, in addition, with a particularly high level of energy efficiency.

In summary, the energy management system 12 depicted by the interaction diagram 10 participates, in particular, in so-called price-based black-box markets, in that it, in particular by means of the load profile 36, makes bids which characterize positive or negative power which can be provided by the assets 28 of the market participant. Within the day-ahead scheduling, which lasts in particular for 24 hours and which is carried out by the day-ahead scheduling 22, an optimal load profile 36, in particular of the entirety of the assets 28 of the grid participant for the grid connection point, is calculated in each case.

In some embodiments, the service provided to the electrical grid by the grid participant comprises that the grid participant feeds electrical energy into the electrical grid and/or provides a system service, in particular stabilization of the electrical grid. In other words, the method may be carried out for energy markets as well as for flexibility markets, for example, trading in control reserves.

In some embodiments, the service which is obtained by the grid participant from the electrical grid comprises that the grid participant receives electrical energy from the electrical grid and consumes it, for example, by means of a consumer from among its assets 28, for example, a heat pump, with the result that, for example, in the event of load peaks of the electrical grid, said electrical grid may be relieved by the grid participant, for which said grid participant may also receive remuneration by means of the market participation.

In some embodiments, the power which can be provided or consumed by the energy management system 12 by controlling the assets 28 is limited to a determinable maximum and/or a determinable minimal value; i.e., the energy management system 12 provides only positive or negative power which is determinable and, for example, definable by a user, up to a certain maximum value.

In some embodiments, the electricity exchange 16 or the energy markets 14 are local quantity-based markets, i.e., trading preferably takes place within the electrical grid configured as a low-voltage electrical grid, or within an electrical grid configured as a medium-voltage electrical grid, to which the grid participant is connected, so that electricity transfer, for example, via transfer grids, to other, for example, medium-voltage electrical grids, advantageously does not occur.

In some embodiments, further variants may also be implemented by interactively repeating the method, in particular for several energy markets 14, in particular electricity markets, or electricity exchanges 16, and transmitting the load profiles, wherein an iterative adjustment of the price curve, i.e., of the updated data 24, can take place on the market side, i.e., on the part of the electricity exchange 16. Thus, the energy management system 12 may receive respective data from several energy markets 14, wherein optimization takes place by means of an optimization problem with respect to the price curve or the data. The resulting load profile 36, i.e., an energy balance at the connection point, is thereby transmitted to the respective energy markets 14.

In some embodiments, a plurality of data 24 may be received in each case from a plurality of energy markets in the form of a plurality of data sets, for example, a plurality of price curves, in particular, for example, ten at a time. In this case, an optimization of the load profile 36 with respect to all these data or price curves is applied as an optimization problem, as mentioned above. Feedback or transmission of the combinations of the price curves with respect to the energy balance or the load profile 36 may thereby take place. The respective energy market 14 or the electricity exchange 16 may thereby choose, in particular, in a centralized manner, a selection from this, in particular discrete, range of load profiles 36, whereby a corresponding provision of, or request for, the power specified by the grid participant on the basis of a load profile 36 of the load profiles may then take place.

The at least one load profile 36 is usually binding only if it is final, i.e., for example, if the data 24 have not changed despite repeated iterations of the method, wherein different load profiles may be generated there as a function of the scheduling parameters 26, despite the data 24 being the same.

In some embodiments, the energy management system 12 compares the power characterized by the load profile 36 as a setpoint power with an actual power output of the grid participant. A compensation which is to be provided in particular with respect to the energy market 14 or the electricity exchange 16, is thereby calculated for a difference between the setpoint power and the actual power output which is determined by the comparison. In other words, penalty payments 44 may be settled by means of the energy management system 12, in particular if the day-ahead scheduling 22 provides a load profile 36 which cannot meet the power output committed to the energy market 14 by the energy management system 12. In some embodiments, the penalty payment 44 may additionally or alternatively already be taken into account in a target function during the operation of the energy management system 12.

To summarize again, if several energy markets 14 participate in the method, each supplies its own data 24. Furthermore, a proprietary energy supplier 40 may be considered to be one of the energy markets 14 or the electricity exchange 16. In this case, a respective adjusted load profile 36 is transmitted, corresponding to the respective data 24, when several energy markets 14 participate. With reference to said load profile, in a final step of the iteration or by means of a further iteration loop 38, a final data set of the data 24 is received, which comprises final, in particular binding, prices, which represent the provision or the drawing of the power by the energy management system 12.

Each of the energy markets 14 is independent, i.e., in particular, the respective energy market 14 does not know what the respective other energy markets 14 are doing. The amount of energy on the local market may be limited, i.e., only a certain volume of power, both positive and negative, is traded.

The aforementioned penalty payment 44 or the compensations are likewise different for each energy market 14. The load management is configured in such a way that it generally controls the assets 28 in such a way that the penalty payments 44 may be kept particularly low. In particular regenerative power-generating assets 28 incur penalty payments 44, in particular, for example, due to lack of wind or sun.

The respective energy market 14 or the respective electricity exchange 16 may in turn have an extended tariff structure which, in particular, for example, may result in particularly fine-grained information, or a plurality of respective pieces of information, in the data 24.

In some embodiments, the service may also be provided or consumed in the form of service flexibility or as a flexibility option, so that, instead of pure energy or an amount of electricity, other capacities may also be correspondingly traded. Thus, the energy management system 12, wherein in its components, for example, the module 30, but in particular the day-ahead scheduling module 22, are summarized as a whole at least as a trading module, is able to contact both energy markets 14 and electricity exchanges 16 on which both energies and capacities are traded.

This may also occur in that the energy management system 12, along with at least one other grid participant or its associated energy management system which is connected or connectable to the electrical grid, forms a virtual power plant 42, wherein the load profile 36 is determined as a function of the formation of the virtual power plant 42. The respective virtual power plant 42 is also carried out for one iteration for the power to be provided then.

In some embodiments, the maximum value or a minimum value of the power may also be limited by the respective energy market 14.

By means of the method, an, or the, energy management system 12, may be operated in such a way that said system can communicate with several electricity exchanges 16 or trading platforms by means of an interface, wherein data 24 including load profiles 36 are exchanged with at least one of the two last-mentioned market participants, wherein this is carried out in particular iteratively until, for example, the end of a trading period, for example, 10 p.m. on the previous day 18, for providing the power on day 20. In some embodiments, the respective load profile 36 and the power provided thereby may be configured in a particularly advantageous and thus economical and/or energy-efficient manner.

The methods described herein may also exist in the form of computer programs or computer program products, which implement the method within the energy management system or a computing device of the energy management system 12, if it is executed on the computing device. Likewise, an electronically readable data storage medium (not depicted) may be present, having electronically readable control information stored thereon which comprises at least one described computer program product and which is designed in such a way that it carries out a described method when the data storage medium is used, in particular, in the energy management system 12.

LIST OF REFERENCE CHARACTERS

10 Interaction diagram
12 Energy management system

14 Energy market
16 Electricity exchange
18 Previous day
20 Current day
22 Day-ahead scheduling
24 Data
26 Scheduling parameters
28 Assets
30 Module
32 Intraday rescheduling
34 Load management
36 Load profile
38 Iteration loop
40 Energy provider
42 Virtual power plant
44 Penalty payment

What is claimed is:

1. A method for operating an energy management system of a grid participant electrically connectable to an electrical grid at a grid connection point, the method comprising:
 a) receiving data from an electricity exchange, the data characterizing a remuneration for a first service provided to the electrical grid by the grid participant and/or a remuneration for a second service obtained by the grid participant from the electrical grid;
 b) determining a load profile for the grid participant as a function of the received data, wherein the energy management system at least temporarily operates the grid participant according to the determined load profile so the grid participant provides the power to the electrical grid and/or obtains the power from the electrical grid;
 c) transmitting the load profile to the electricity exchange;
 d) comparing an amount of power represented by the load profile as a setpoint power with an actual power output of the grid participant;
 e) calculating a compensation based on any difference between the setpoint power and the actual power output determined by the comparison; and
 f) controlling operation of the grid participant to minimize any penalty payments corresponding to the compensation.

2. The method as claimed in claim 1, further comprising repeating steps a) to c) until a termination condition is met.

3. The method as claimed in claim 2, wherein the termination condition includes a time of day when the data from the electricity exchange is not available.

4. The method as claimed in claim 2, wherein the termination condition comprises a threshold value for remuneration.

5. The method as claimed in claim 1, wherein the first service comprises feeding electrical energy from the grid participant into the electrical grid and/or stabilizes the electrical grid.

6. The method as claimed in claim 1, wherein the second service comprises receiving electrical energy at the grid participant from the electrical grid.

7. The method as claimed in claim 1, further comprising calculating the load profile as an optimization problem.

8. The method as claimed in claim 1, further comprising limiting the power to a maximum value and/or or to a minimum value.

9. The method as claimed in claim 1, further comprising forming a virtual power plant including at least one further associated energy management system connected to the electrical grid.

10. The method as claimed in claim 9, further comprising determining the load profile as a function of the formation of the virtual power plant.

11. An electronic computing device comprising:
 a processor; and
 a memory storing a set of instructions, the set of instructions when accessed and executed by the processor, causing the processor to:
 a) receive data from an electricity exchange, the data characterizing a remuneration for a first service provided to an electrical grid by a grid participant and/or a remuneration for a second service obtained by the grid participant from the electrical grid;
 b) determine a load profile for the grid participant as a function of the received data, wherein a energy management system at least temporarily operates the grid participant according to the determined load profile so the grid participant provides the power to the electrical grid and/or obtains the power from the electrical grid;
 c) transmit the load profile to the electricity exchange;
 d) comparing an amount of power represented by the load profile as a setpoint power with an actual power output of the grid participant; and
 e) calculating a compensation for a difference between the setpoint power and the actual power output determined by the comparison; and
 f) controlling operation of the grid participant to minimize any penalty payments corresponding to the compensation.

12. A non-transitory electronically readable data storage medium storing a set of instructions, the set of instructions when accessed and executed by a processor, causing the processor to:
 a) receive data from an electricity exchange, the data characterizing a remuneration for a first service provided to an electrical grid by a grid participant and/or a remuneration for a second service obtained by the grid participant from the electrical grid;
 b) determine a load profile for the grid participant as a function of the received data, wherein an energy management system at least temporarily operates the grid participant according to the determined load profile so the grid participant provides the power to the electrical grid and/or obtains the power from the electrical grid;
 c) transmit the load profile to the electricity exchange;
 d) comparing an amount of power represented by the load profile as a setpoint power with an actual power output of the grid participant; and
 e) calculating a compensation for a difference between the setpoint power and the actual power output determined by the comparison; and
 f) controlling operation of the grid participant to minimize any penalty payments corresponding to the compensation.

* * * * *